Figure 1:
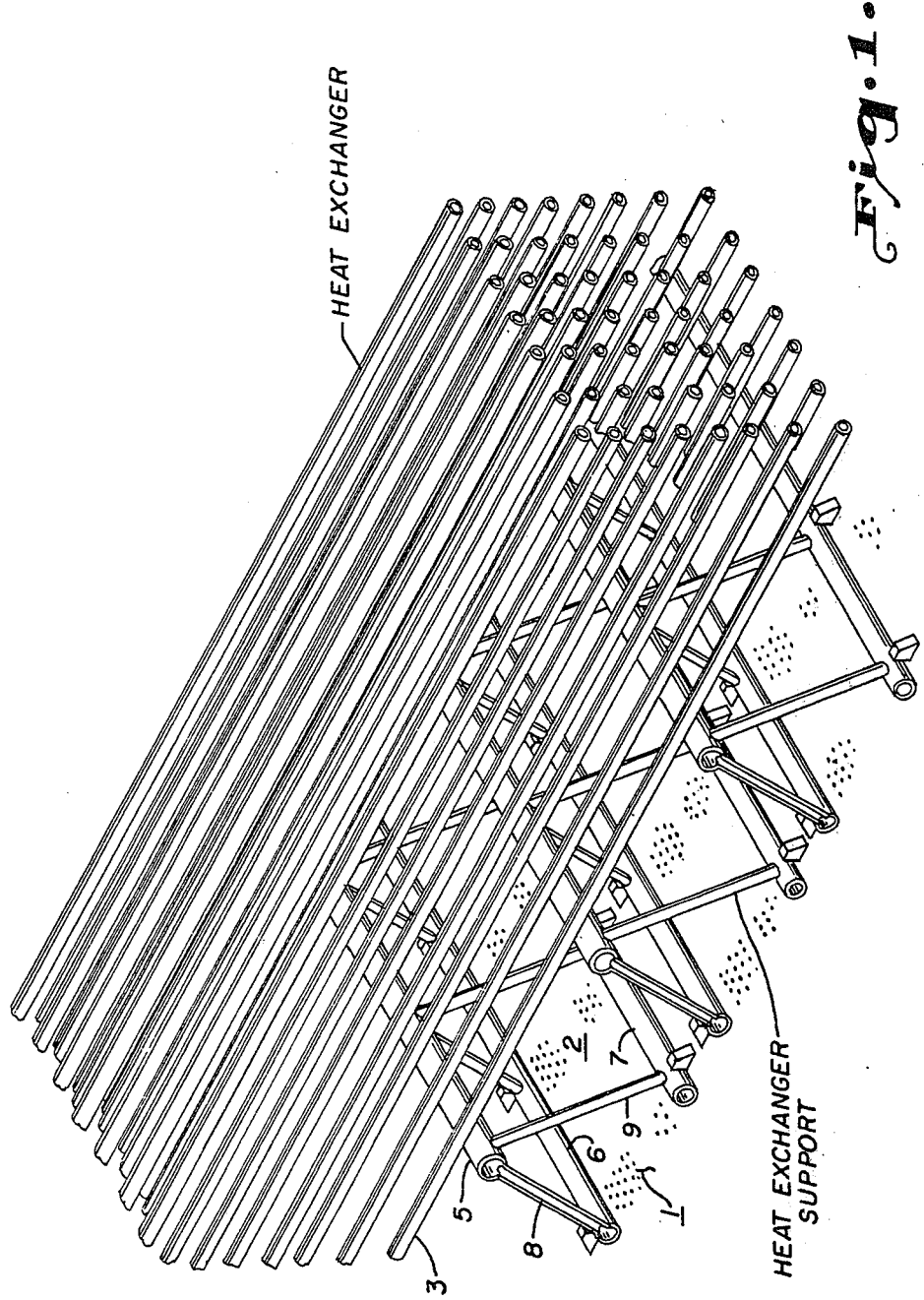

United States Patent [19]

Lawton

[11] 4,331,106
[45] May 25, 1982

[54] HEAT EXCHANGER SUPPORT APPARATUS IN A FLUIDIZED BED

[75] Inventor: Carl W. Lawton, West Hartford, Conn.

[73] Assignee: Combustion Engineering, Inc., Windsor, Conn.

[21] Appl. No.: 242,958

[22] Filed: Mar. 12, 1981

[51] Int. Cl.³ .......................... F22B 37/24; F28F 9/00
[52] U.S. Cl. .................................. 122/510; 122/4 D; 165/67; 165/68
[58] Field of Search .................. 165/67, 68; 122/4 D, 122/510; 432/234, 235

[56] References Cited

U.S. PATENT DOCUMENTS

| 445,926 | 2/1891 | Cobb | 165/68 |
|---|---|---|---|
| 709,139 | 9/1902 | Collum | 165/68 |
| 841,985 | 1/1907 | Kinnean | 165/68 |
| 2,020,874 | 11/1935 | Budnick | 165/68 |
| 2,268,730 | 1/1942 | Vagt | 165/67 |
| 3,467,068 | 9/1969 | Brunner | 122/510 |
| 4,173,950 | 11/1979 | Wanyasz | 122/4 D |
| 4,287,838 | 9/1981 | Frosch | 122/4 D |

FOREIGN PATENT DOCUMENTS 2435001  2/1975  Fed. Rep. of Germany ...... 432/234

Primary Examiner—Henry C. Yuen
Attorney, Agent, or Firm—Arthur L. Wade

[57] ABSTRACT

A heat exchanger is mounted in the upper portion of a fluidized combusting bed for the control of the temperature of the bed. A support, made up of tubes, is extended from the perforated plate of the fluidized bed up to the heat exchanger. The tubular support framework for the heat exchanger has liquid circulated therethrough to prevent deterioration of the support.

2 Claims, 2 Drawing Figures

HEAT EXCHANGER SUPPORT APPARATUS IN A FLUIDIZED BED

The Government of the United States of America has rights in this invention pursuant to Contract No. EX-76-C-01-2473 awarded by the U.S. Department of Energy.

TECHNICAL FIELD

The present invention relates to the support of cooling structure for a fluidized bed, which cooling limits the temperature of the bed and its formation of sulfur and nitrogen compounds. More particularly, the invention relates to structure extending from the perforated plate beneath the fluidized bed in support of cooling coils within the bed, the support structure being cooled by liquid subsequently utilized to generate vapor.

BACKGROUND ART

As the energy crisis continues, the use of coal gains in importance. It is generally agreed by industry that tremendous coal reserves are available, leaving the more prominent problems of transportation and handling to be solved.

The equipment in which coal is burned has been steadily improved from the old locomotive where shovelfuls of the solid fuel were pitched onto a grate where the heat of combustion rose to the bottom of a water boiler. Coal is now controlled in its particle size by highly sophisticated mills and is air-transported through conduits and discharged from nozzles into zones of combustion. At present, development has concentrated on burning crushed coal in a bed supported by a horizontally extended perforated structure up through which combustion air is forced. The problems of introducing the crushed solid fuel into the bed fluidized above the perforated support are paralleled by the innovations in the system for removing solid residue from the zone of cumbustion.

Beyond the problems of fuel flow into the bed, and ash removal from the bed, is the problem of inhibiting discharge of sulfur and nitrogen compounds with the gaseous products of combustion. There are many different approaches to the control of these environment-threatening substances, and the control of the maximum temperature of the fluidized bed in combustion is a significant factor. In general, the present problems revolve around maintaining a heat exchanger in contact with the upper portion of the bed to maintain temperature control.

Establishing the reaches of a tubular heat exchanger within the upper portion of the bed for its temperature control, may appear to be a simple problem. The vertical banks of heat exchanger tube reaches are to be supported in their longitudinal extension within the bed. The vertical banks of tubes may be horizontally spaced from each other at distances which will not interfere with the fluidizing of the combusting bed. The present problem is how to support these vertical banks of horizontal reaches by a structure which extends up from the perforated bed support. This support for the heat exchanger is exposed to the high temperature of the bed and, therefore, this temperature must be controlled to prevent thermal distortion and deterioration of the support.

DISCLOSURE OF THE INVENTION

The present invention contemplates a support for a heat exchanger comprising tubes through which liquid is circulated to protect the support framework from distortion and deterioration by the heat of the bed. The basic module of the framework appears to have a cross-sectional configuration of an A-frame, the two lower legs of the framework anchored to the perforated plate supporting the fluidized bed. The cooling liquid circulated in the tubes of the framework enters the two lower tubes and circulates upward to discharge from the upper tube. The rate of flow of the cooling liquid, the approach temperature of the cooling liquid, and the flow pattern of the cooling liquid within the tubes of the framework combine to insure that the liquid will not vaporize within the tubes and will flow from the tubes to downstream vapor-generating tubes, also heated by the fluidized bed.

Other objects, advantages and features of this invention will become apparent to one skilled in the art upon consideration of the written specification, appended claims, and attached drawings.

BRIEF DESIGNATION OF THE DRAWINGS

Figure 2:
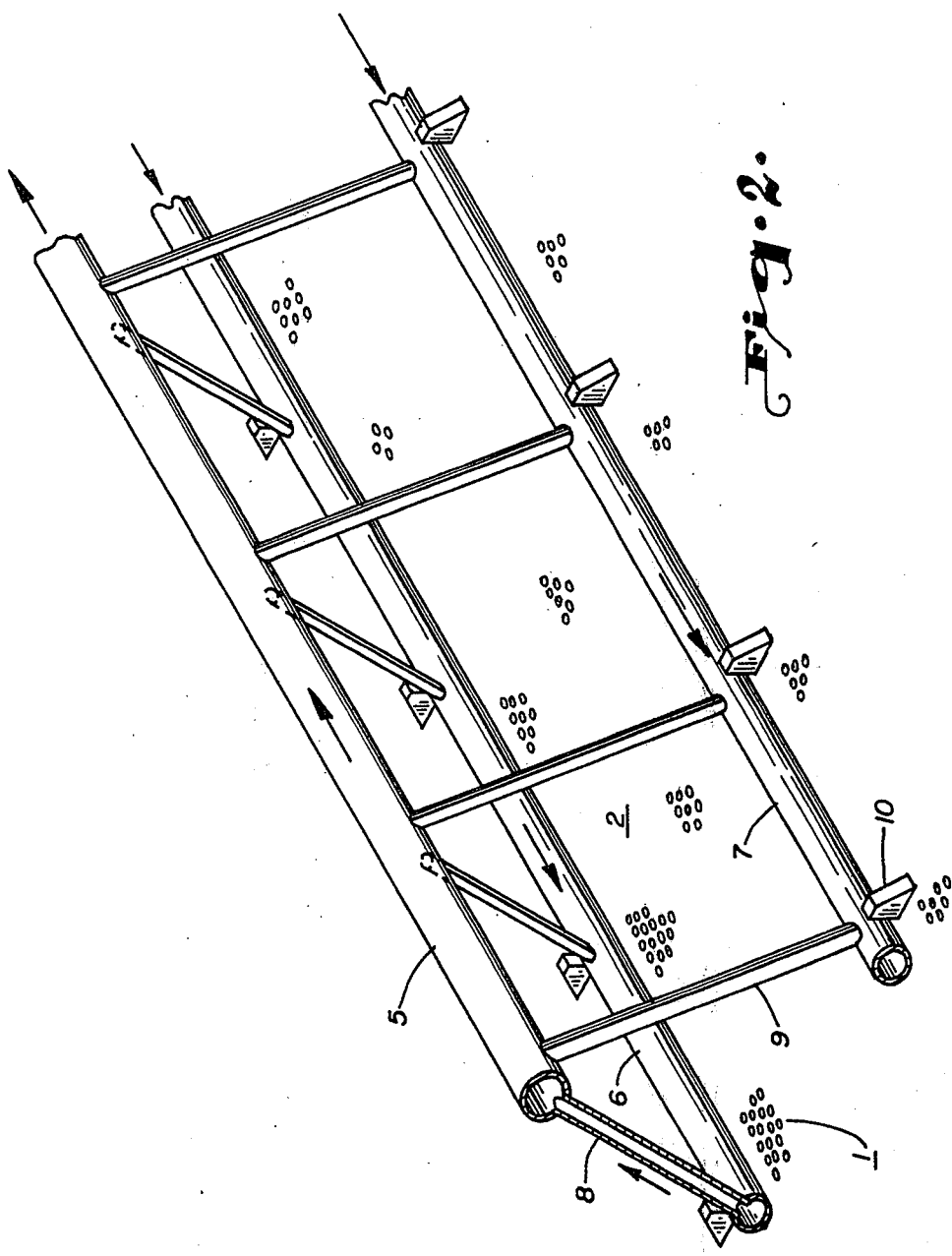

FIG. 1 is a perspective elevation of a fluidized bed portion with a bed-temperature-controlling heat exchanger supported within the fluidized bed by structure embodying the present invention; and FIG. 2 is a single module of the heat exchanger support of FIG. 1 in sectioned perspective.

BEST MODE FOR CARRYING OUT THE INVENTION

Referring specifically to FIG. 1, the perforated horizontal plate 1 for a combusting, fluidized bed 2 is arranged to function as a distributor for combustion air flowing upward through the bed. The fluidized bed is supplied crushed solid fuel by a system not disclosed in FIG. 1. Additionally, the system for continuously removing the burned residue of solid fuel from the bed is not shown. Importantly, heat exchange structure 3 is disclosed as extending horizontally within the upper portion of the bed 2.

The heat of combustion generated in the bed 2 is absorbed by heat exchanger 3 and additional tubes which conventionally form the walls of the enclosure for combusting bed 2. The discharge passage, or stack, for the products of combustion which rise from bed 2 are details which do not directly concern the present invention. The heat-absorbing tubes in which liquid is heated into vapor may take many forms and positions in relation to bed 2. These forms and positions are not of immediate concern in disclosing the present invention embodied in the support structure which maintains the heat exchanger 3 in position above the perforated plate 1. The crushed fuel continuously replenishing bed 2 is usually mixed with limestone in order to capture the sulfur compounds in the crushed fuel. The desired reaction between the limestone and the sulfur compounds of the crushed fuel takes place most efficiently within a narrow temperature range including 1450° F. Also, this temperature range militates against fusion of the sulfur and coal. Additionally, if the bed temperature is maintained below 1500° F., the production of polluting nitrogen compounds will be drastically attenuated. Therefore, heat exchanger 3 is supported by the inventive embodiment within the upper portion of bed 2 in order to keep the maximum bed temperature below 1500° F.

The configuration of heat exchanger 3 must not interfere with the operation of the combusting bed 2. Fresh crushed fuel is transported by air through conduits into the bed 2 and the distribution of this fuel by nozzles spaced over the horizontal surface of perforated plate 1 must function without the fuel distribution being distorted by impact upon the heat exchanger 3. Generally, the tube banks of the heat exchanger 3 are grouped into vertical stacks, the stacks being spaced horizontally from each other to avoid interference with fuel distribution into the bed 2. The present invention provides structure extending up from the plate 1 and extending transversely beneath the horizontal U-tube reaches of heat exchanger 3.

The structure with which the heat exchanger tubes are supported, is, in the first instance, a series of tubes extending across the width of bed 2. Referring, specifically, to FIG. 2, one of these tubes 5 is disclosed as a part of the module of the complete support framework. Tube 5 is one of the support tubes maintained in direct contact with the underside of heat exchanger 3. Each tube 5 is extended beneath heat exchanger 3 and parallel the surface of support plate 1. The vertical distance between support tube 5 and plate 1 is predetermined by design to support the heat exchanger 3 in the upper portion of bed 2. Supplied with a proper cooling fluid, heat exchanger 3 is then able to maintain the temperature of bed 2 within the range required to control the reaction between the sulfur compounds of the coal and the limestone, and the suppression of nitrogen compounds. Tube 5, itself, must be cooled by fluid to avoid distortion and deterioration. Further, all of the structure supporting tube 5 from plate 1 must be fluid-cooled. Therefore, tube 5 is communicated with the tubes which make up its supporting structure in order for cooling fluid to be passed through all of the support structure and exit from tube 5.

Again, FIG. 2 represents only one of the modules of the complete framework which supports heat exchanger 3. Each module has tube 5 and all of the tubes 5, beneath heat exchanger 3, form a web, or grid, for support of the heat exchanger 3 across, and above, the upper surface of plate 1. Of course, the cooling fluid for this support web is more than likely to be water. Further, the tubes of heat exchanger 3 can be connected to the tubular framework supporting tubes 5 to pass this cooling water serially through heat exchanger 3 and the tubular support framework. Together, this matrix of tubes can be positioned in the feedwater system of the steam-generating tubes absorbing heat from the combusting fluidized bed, as a feedwater preheater. The flow rate of this cooling fluid, and its approach temperature, to the exchanger 3 and supporting framework should be controlled to militate against the formation of steam prior to the feedwater reaching the steam-generating tubes downstream.

To continue with the details of the support structure for tube 5, FIG. 2 gives us a sectioned perspective of the tubular framework. A pair of tubes 6 and 7 are extended along the upper surface of plate 1 parallel to tube 5. A plurality of connecting tubes 8 and 9 extend between tubes 6 and 7 and tube 5. In the sectioned perspective of FIG. 2, tube 5, parallel tubes 6 and 7, and connecting tubes 8 and 9 will give the appearance of an A-frame, viewed from the end of the module.

The inherent strength of the A-frame configuration of FIG. 2 is obvious. All of the tubes communicate with each other. Therefore, this sturdy, mechanical support module for its tube 5 and heat exchanger 3 resting thereon, has its temperature controlled by the flow of water forced into tubes 6 and 7, up connecting tubes 8 and 9, and out tube 5. Although exposed to the temperature of the combusting bed 2, this support for exchanger 3 is protected from distortion and deterioration by the cooling effect of the fluid passed through the tubes making up the frame of the support.

The pair of parallel tubes 6 and 7 extended over the upper surface of plate 1, are anchored to plate 1 by lugs 10 welded to the outside surface of tubes 6 and 7 at positions where they will be welded to plate 1 so as to leave combustion air holes in plate 1 free to transmit combustion air. Lateral movement of the tubes 6 and 7 is prevented by this anchor structure and the stabilized framework contributes its part to the complete support of exchanger 3.

CONCLUSION

The present invention is basically embodied in the tubular framework supporting a heat exchanger in the upper portion of a combusting fluidized bed of solid fuel above the perforated plate. Heretofore, various arrangements of stringers have been extended across the combusting beds to support heat exchangers cooling the upper portion of the bed. The heat of the bed has warped these solid stringers and caused them to deteriorate to the point of failure. In other words, the prior art support structure has been burned up, in short order, by the bed heat.

The present invention includes the concept of fluid-cooled support structure. Further, the invention is embodied in structure mounted on the floor of the combusting bed to extend directly up in support of the heat exchanger. This heat exchanger support structure is formed of tubes communicating with each other so that coolant will flow through the entire support framework to keep its temperature low enough to prevent distortion and undue deterioration.

The preferred mode of the invention begins with a series of metallic tubes extended across the bed transverse the U-tubes of the heat exchanger extended from one side of the bed. Next, each of the support tubes has its own module of framework extending from the bed support plate. Each module comprises, simply, a pair of tubes extending parallel their support tube and resting on the upper surface of the bed support plate. A plurality of tube legs extend from each pair of plate tubes up to their support tube. With all of these tubes communicating with each other, the result is a framework which can be connected to a supply of coolant flowing into the bottom tubes and out the top support tube. The entire support structure is stabilized by lugs welded to the bed plate.

Extending the concept beyond the simple module for each support tube, the entire matrix can be used to preheat feedwater flowing into the steam-generating tubes. The supported heat exchanger can be connected to the support tubes to form an additional circuit which can absorb the heat of the combusting bed into feedwater flowing through both structures in series. Thus, the improved support structure can be used, with the heat exchanger, to preserve the heat for the system whose ultimate purpose is to generate vapor from the liquid.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. A support structure for a heat exchanger within the upper portion of a combusting fluidized bed wherein the heat exchanger comprises banks of U-tubes extending horizontally from one side of the combusting bed, including;

a series of tubular frameworks extending beneath the banks of heat exchanger tubes transverse the lengths of the tubes, and each framework having;

a support tube extending transverse the length of the heat exchanger tubes and bearing on the underside of the banks, a pair of tubes extended parallel the support tube and engaging the support structure of the combusting bed, and a plurality of connecting tubes between the support tube and the lower pair of tubes to form a framework of cross-sectional A-frame configuration;

and a supply of water connected to the lower pair of tubes of the framework to flow the water to and from the support tube through the plurality of connecting tubes.

2. The support structure of claim 1, including, a connection between the heat exchanger tubes and the framework tubes for the flow of water between the structures in maintaining the temperature of the support structure below a predetermined minimum and the temperature of the upper portion of the bed within a predetermined range.

* * * * *